US011652765B2

(12) United States Patent
Jung et al.

(10) Patent No.: US 11,652,765 B2
(45) Date of Patent: May 16, 2023

(54) METHOD, SYSTEM, AND NON-TRANSITORY COMPUTER-READABLE RECORD MEDIUM FOR CONTROLLING INTERNET OF THINGS (IOT) DEVICE USING MESSENGER BOT

(71) Applicant: LINE Plus Corporation, Seongnam-si (KR)

(72) Inventors: JaeYun Jung, Seongnam-si (KR); Su Ahn Lee, Seongnam-si (KR); Youngsub Park, Seongnam-si (KR); Seung Wook Han, Seongnam-si (KR); Hee Jong Lee, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 80 days.

(21) Appl. No.: 17/228,805

(22) Filed: Apr. 13, 2021

(65) Prior Publication Data
US 2021/0234818 A1    Jul. 29, 2021

Related U.S. Application Data

(63) Continuation of application No. 16/569,851, filed on Sep. 13, 2019, now Pat. No. 11,005,791.

(30) Foreign Application Priority Data

Oct. 4, 2018 (KR) .................. 10-2018-0118215

(51) Int. Cl.
*H04L 51/046* (2022.01)
*G05B 15/00* (2006.01)
*H04L 51/18* (2022.01)

(52) U.S. Cl.
CPC ............ *H04L 51/046* (2013.01); *G05B 15/00* (2013.01); *H04L 51/18* (2013.01); *G05B 2219/2642* (2013.01)

(58) Field of Classification Search
CPC ..................................... H04L 51/046
See application file for complete search history.

(56) References Cited

U.S. PATENT DOCUMENTS

| 2016/0105292 A1 | 4/2016 | Choi et al. |
| 2017/0246545 A1 | 8/2017 | Wilhite et al. |
| 2018/0020505 A1* | 1/2018 | Deros ................. F21V 33/0048 |
| 2018/0152411 A1 | 5/2018 | Lee et al. |

FOREIGN PATENT DOCUMENTS

KR    10-2014-0008667 A    1/2014

OTHER PUBLICATIONS

Non-Final Office Action dated Jul. 23, 2020 in U.S. Appl. No. 16/569,851.
Notice of Allowance dated Jan. 11, 2021 in U.S. Appl. No. 16/569,851.

* cited by examiner

*Primary Examiner* — Esther B. Henderson
(74) *Attorney, Agent, or Firm* — Harness, Dickey & Pierce, P.L.C.

(57) ABSTRACT

Provided is a method of controlling an Internet of Things (IoT) device using a messenger bot, the method including adding a chatroom with a bot for interaction between an IoT server and a user of a messenger; and instructing the IoT server to transmit a control signal to the IoT device in response to a control input that is input from the user to the bot through the chatroom.

19 Claims, 10 Drawing Sheets

METHOD, SYSTEM, AND NON-TRANSITORY COMPUTER-READABLE RECORD MEDIUM FOR CONTROLLING INTERNET OF THINGS (IOT) DEVICE USING MESSENGER BOT

CROSS-REFERENCE TO RELATED APPLICATIONS

This U.S. non-provisional application is a Continuation of U.S. application Ser. No. 16/569,851, filed on Sep. 13, 2019, which claims the benefit of priority under 35 U.S.C. § 119 to Korean Patent Application No. 10-2018-0118215 filed on Oct. 4, 2018, in the Korean Intellectual Property Office (KIPO), the entire contents of each of which are incorporated herein by reference.

BACKGROUND

Field

One or more example embodiments relate to technology for controlling an Internet of Things (IoT) device.

Description of Related Art

Internet of Things (IoT) refers to performing inter-communication by connecting a variety of communicable things to a network. All of the systematically recognizable objects may be classified into things or objects, and may include things or persons capable of including a near field communication (NFC) function and a far field communication function and producing and using data, such as a sensor.

IoT may be an infrastructure to implement a ubiquitous space. The ubiquitous space is initiated in such a manner that an environment or a thing itself becomes proficient, or "smart," by providing computing devices equipped with specific functions in the environment.

An IoT service refers to technology for providing a safer and more secure life to persons. Accordingly, various mobile communication companies and terminal manufacturing companies are focusing on the development of a terminal and a service for supporting an IoT service that is a next generation mobile service.

SUMMARY

One or more example embodiments provide a method and system that may add a bot for interaction with an Internet of Things (IoT) server to a messenger and may register and control an IoT device through the corresponding bot.

One or more example embodiments provide a method and system that may control various types of IoT devices under a corresponding IoT server by interacting with the IoT server through a bot in a chatroom via a messenger without using a separate application.

One or more example embodiments provide a method and system that may record and manage control content about an IoT device through an IoT bot in a form of a chat message of a messenger chatroom.

One or more example embodiments provide a method and system that may use a control history of an IoT device through a chatroom with an IoT bot as data for maintaining and/or repairing the IoT device.

One or more example embodiments provide a method and system that may use a chatroom with an IoT bot as an interface for controlling an IoT device and a counselling interface with the IoT device.

One or more example embodiments provide a method and system that may invite a friend to a chatroom with an IoT bot and may provide a right of the friend to control an IoT device.

According to an aspect of at least one example embodiment, there is provided an IoT control method implemented by a computer system including processing circuitry configured to execute computer-readable instructions included in a memory, the method including adding, by the processing circuitry, a chatroom with a bot for interaction between an IoT server and a user of a messenger installed on the computer system; and instructing the IoT server to transmit a control signal to the IoT device in response to a control input that is input from the user to the bot through the chatroom.

In some example embodiments, the adding may include adding the chatroom with the bot to a chatroom list of the messenger in response to an input from the user adding an account of the IoT server.

In some example embodiments, the adding may include providing a user interface to the user, receiving user information from the user through the user interface, and adding the chatroom with the bot after verifying whether the user registered with the IoT server based on the user information.

In some example embodiments, the adding may include transmitting the user information about the user and registered with the messenger to the IoT server to enable the IoT server to newly register the user information and/or match the user information to existing user information about the user that has been registered with the IoT server.

In some example embodiments, the adding may include retrieving information about the IoT device through a device search as a device to be controlled through the chatroom with the bot, and registering the IoT device based on the information. In some example embodiments, the device search may involve wireless technology, such as near-field communication (NFC) and/or WiFi.

In some example embodiments, the adding may include transmitting, to the IoT device, IoT device identification information for the IoT device and/or a (for example, unique) classifier that is matched to the IoT device identification information for the IoT device.

In some example embodiments, the adding may include adding a friend user selected by the user of the messenger from a friend list of the messenger to the chatroom with the bot.

In some example embodiments, the adding may include causing the friend user to be granted a right capable of controlling the IoT device during a period of time relative to a point in time at which the friend user is added to the chatroom with the bot.

In some example embodiments, the instructing may include transmitting, to the IoT server, the control signal including information about the IoT device corresponding to the control input and a control instruction in association with the user.

In some example embodiments, the instructing may include providing an IoT device list controllable through the chatroom with the bot and a menu list including a function of the IoT device; receiving the control input from the user based on the IoT device list and the menu list; and specifying the IoT device to be controlled in response to the control input and the control instruction.

In some example embodiments, the instructing may include specifying the IoT device and the control instruction by analyzing a sentence input from the user as a chat message through the chatroom with the bot.

In some example embodiments, the IoT control method may further include recording, by the processing circuitry, control content about the IoT device by storing at least one message transmitted and received through the chatroom with the bot.

According to an aspect of at least one example embodiment, there is provided a non-transitory computer-readable record medium storing instructions that, when executed by processing circuitry, cause the processing circuitry to perform the IoT control method on a computer.

According to an aspect of at least one example embodiment, there is provided a computer system including processing circuitry configured to execute computer-readable instructions included in a memory. The processing circuitry includes an IoT register configured to add a chatroom with a bot for interaction between an IoT server and a user of a messenger installed on the computer system, and to register an IoT device controllable by the IoT server; and an IoT controller configured to control the IoT device by transmitting a control signal for the IoT device to the IoT server in response to a control input that is input from the user to the bot through the chatroom.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Some example embodiments will be described in more detail with regard to the figures, wherein like reference numerals refer to like parts throughout the various figures unless otherwise specified, and wherein.

Figure 1:
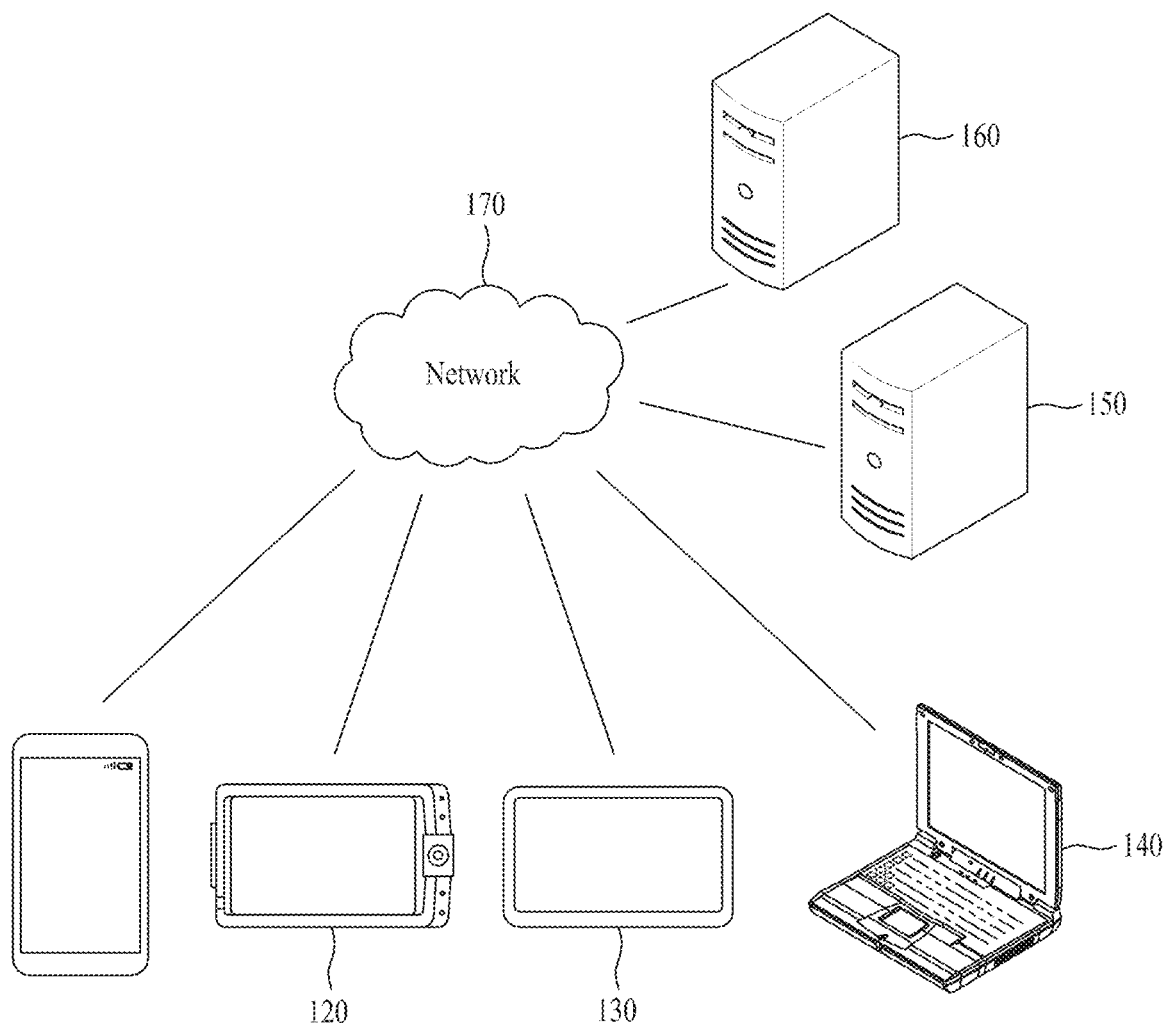
FIG. 1 illustrates an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same or similar meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Some example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, and/or in some cases be performed in reverse order.

Units and/or devices according to one or more example embodiments may be implemented using processing circuitry. For example, processing circuitry may include hardware such as logic circuits; a hardware/software combination, such as a processor executing software; or a combination thereof. For example, a processor may include, but is not limited to, a Central Processing Unit (CPU), a graphics processing unit (GPU), a controller, an arithmetic logic unit (ALU), a digital signal processor, a microcomputer, a field programmable gate array (FPGA), a System-on-Chip (SoC), a programmable logic unit, a microprocessor, an application-specific integrated circuit (ASIC), and/or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device that includes processing circuitry (e.g., a processor such as a Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable record media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable record media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record media may include a Universal Serial Bus (USB) flash drive, a memory stick, a Blu-ray/DVD/CD-ROM drive, a memory card, and/or other like computer readable record media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of some example embodiments, or they may be known devices that are altered and/or modified for the purposes of some example embodiments.

A hardware device, such as a computer processing device, may run an operating system (OS) and one or more software applications that run on the OS. The computer processing device also may access, store, manipulate, process, and/or create data in response to execution of the software. For simplicity, one or more example embodiments may be exemplified as one computer processing device; however, one skilled in the art will appreciate that a hardware device may include multiple processing elements and multiple types of processing elements. For example, the processing circuitry of a hardware device may include multiple processors or a processor and a controller. In addition, other processing configurations of the processing circuitry are possible, such as parallel processors.

Although described with reference to specific examples and drawings, modifications, additions and substitutions of some example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

Some example embodiments relate to technology for controlling an Internet of Things (IoT) device using a messenger bot.

Some example embodiments including the detailed disclosures may relate to adding a bot for interaction with an IoT server to a messenger and controlling an IoT device under the IoT server through the corresponding bot, which may lead to achieving many advantages in terms of availability, efficiency, convenience, efficiency, and/or cost reduction.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto.

In the example of FIG. 1, each of the plurality of electronic devices 110, 120, 130, and 140 may be a fixed terminal or a mobile terminal configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an IoT device, a virtual reality (VR) device, and an augmented reality (AR) device. For example, although FIG. 1 illustrates a shape of a smartphone as an example of the electronic device 110, the electronic device 110 may refer to one of various physical computer systems capable of communicating with other electronic devices 120, 130, and 140, and/or the servers 150 and 160 over the network 170 in a wired communication manner or in a wireless communication manner.

The communication scheme is not particularly limited and may include a communication method using a near field communication between devices as well as a communication method using a communication network, for example, a mobile communication network, the wired Internet, the wireless Internet, a broadcasting network, and a satellite network, which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and/or the Internet. Also, the network 170 may include at least one of network topologies that include a bus network, a star network, a ring network, a mesh network, a star-bus network, a tree or hierarchical network, and the like. However, such are only examples, and some example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and 140 over the network 170. For example, the server 150 may be a system that provides a first service to the plurality of electronic devices 110, 120, 130, and/or 140 over the network 170, and the server 160 may be a system that provides a second service to the plurality of electronic devices 110, 120, 130, and/or 140 over the network 170. In detail, the server 150 may provide a service, for example, a messenger service, desired by a corresponding application as the first service to the plurality of electronic devices 110, 120, 130, and/or 140 through the application of the computer program installed and executed on the plurality of electronic devices 110, 120, 130, and/or 140. As another example, the server 160 may provide a service for distributing a file for installing and executing the application to the plurality of electronic devices 110, 120, 130, and/or 140 as the second service.

Figure 2:
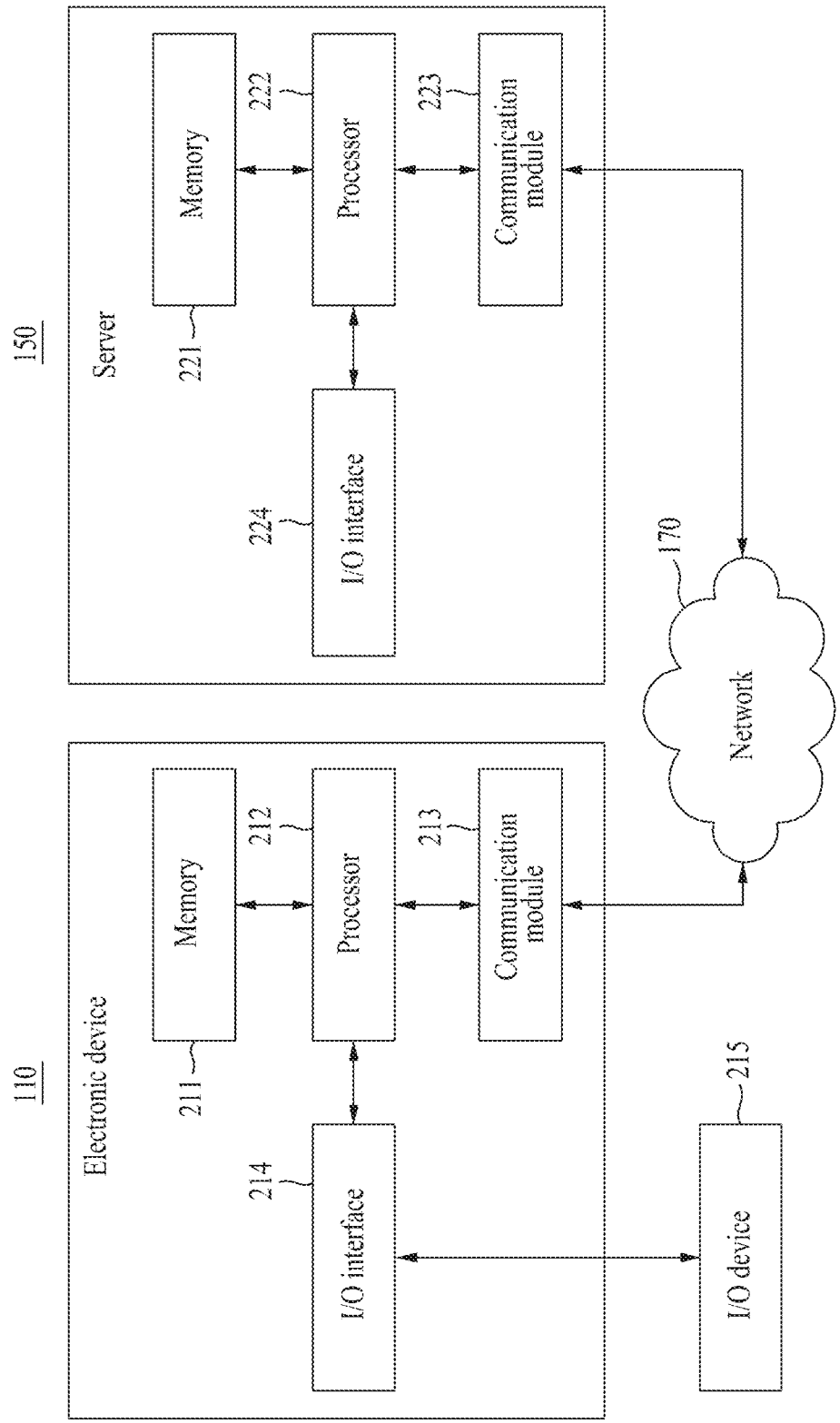
FIG. 2 illustrates an example of an electronic device and a server according to at least one example embodiment.

FIG. 2 is a block diagram illustrating an example of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers, including a plurality of electronic devices and/or a plurality of servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), a read only memory (ROM), a disk drive, a solid state drive (SSD), and a flash memory, such as a non-transitory computer-readable record medium. The permanent and/or non-transitory mass storage device, such as ROM, SSD, flash memory, and disk drive, may be included in the electronic device 110 or the server 150 as a permanent and/or non-transitory storage device separate from the memory 211, 221. Also, an OS or at least one program code, for example, a code for a browser installed and executed on the electronic device 110 or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to some other example embodiments, software components may be loaded to the memory 211, 221 through the communication module 213, 223, instead of, or in addition to, the non-transitory computer-readable record medium. For example, at least one program may be loaded to the memory 211, 221 based on a computer program, for example, the application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170, and/or may provide a function for communication with another electronic device, for example, the electronic device 120 or another server, for example, the server 160. For example, the processor 212 of the electronic device 110 may transfer a request created based on a program code stored in a storage device, such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a record medium further includable in the electronic device 110.

The I/O interface 214 may be a device used for interface with an I/O device 215. For example, an input device may include a device, such as a keyboard, a mouse, a microphone, and a camera, and an output device may include a device, such as a display, a speaker, and a haptic feedback device. As another example, the I/O interface 214 may be a device for interface with an apparatus in which an input function and an output function are integrated into a single function, such as a touchscreen. The I/O device 215 may be configured as a single device with the electronic device 110. Also, the I/O interface 224 of the server 150 may be a device for interface with an apparatus (not shown) for input or output that may be connected to the server 150 or included in the server 150. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a number of components that may be greater or less than a number of components shown in FIG. 2. For example, the electronic device 110 may include at least a portion of the I/O device 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an accelerometer sensor, a gyro sensor, a camera module, various physical buttons, a button using a touch panel, an I/O port, a vibrator for vibration, etc., which are generally included in the smartphone.

Hereinafter, some example embodiments of a method and system for controlling an IoT device are described.

Here, the term "IoT device" may inclusively indicate any type of smart devices or sensors, for example, a smart grid system that manages energy including electricity/gas or water and sewage, a home network system that integrally manages air-conditioning and heating in a house, and a smart key capable of automatically unlocking a locking device of a vehicle door or starting a vehicle without inserting the key.

Figure 3:
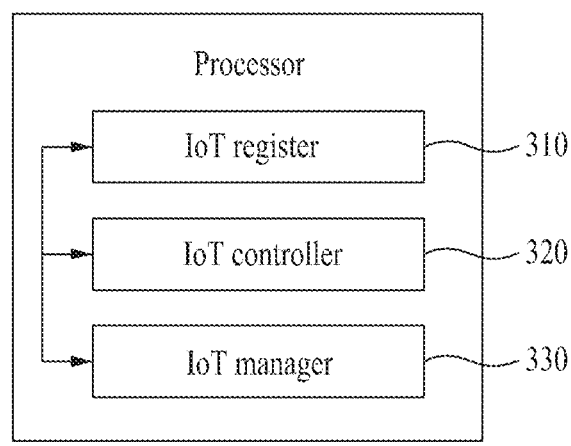
FIG. 3 illustrates an example of a component includable in processing circuitry of an electronic device according to at least one example embodiment.
Figure 4:
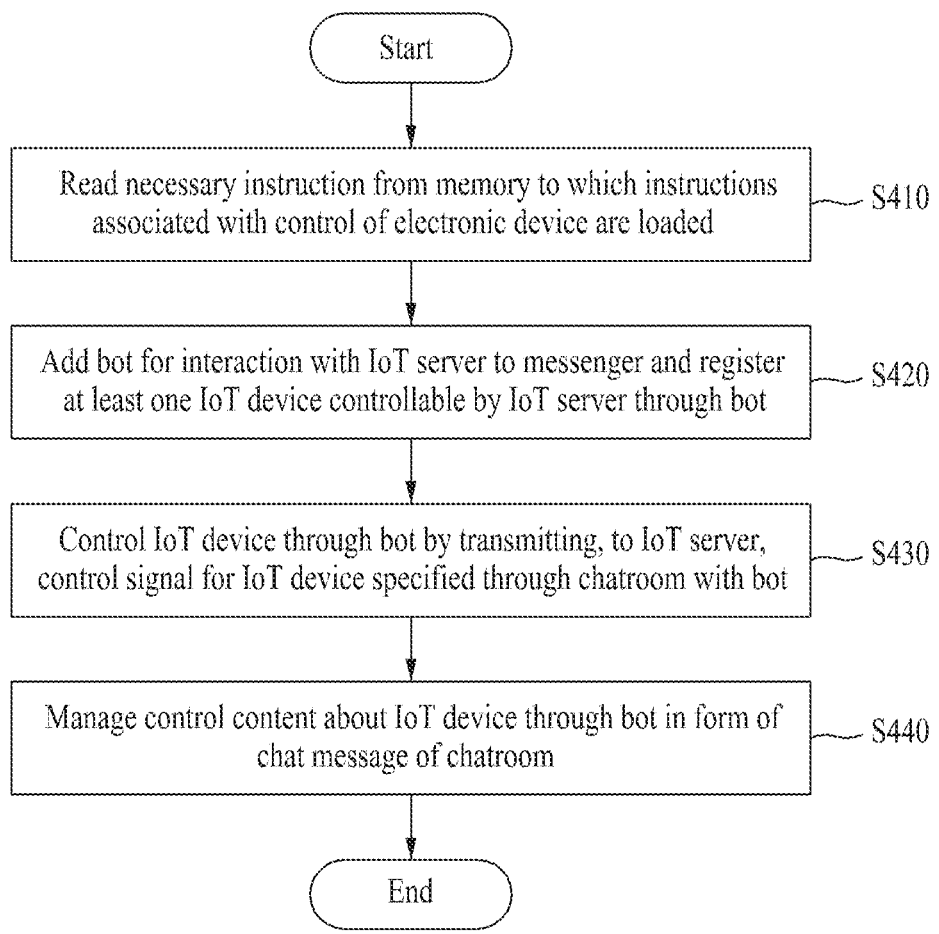
FIG. 4 is a flowchart illustrating an example of a method performed by an electronic device according to at least one example embodiment.

FIG. 3 is a diagram illustrating an example of a component includable in a processor of an electronic device according to at least one example embodiment, and FIG. 4 is a flowchart illustrating an example of a method performed by an electronic device according to at least one example embodiment.

An IoT control system implemented as a computer may be configured in the electronic device 110. For example, the IoT control system may be configured in a form of an independently operating program or in an in-app form of a specific application to be operable on the specific application. In particular, the IoT control system may provide a function of adding a bot for interaction with an IoT server, for example, the server 160, to a messenger installed on the electronic device 110 and registering and controlling an IoT device under the IoT server through the corresponding bot.

The IoT control system configured in the electronic device 110 may perform an IoT control method of FIG. 4 in response to an instruction provided from an application installed on the electronic device 110.

To perform the IoT control method of FIG. 4, the processor 212 of the electronic device 110 may include an IoT register 310, an IoT controller 320, and an IoT manager 330 as shown in FIG. 3, as components. Also, in some example embodiments, components of the processor 212 may be separated and/or merged for functional representation of the processor 212.

The processor 212 and the components of the processor 212 may control the electronic device 110 to perform operations S410 to S440 included in the IoT control method of FIG. 4. For example, the processor 212 and the components of the processor 212 may be configured to execute an instruction according to a code of at least one program and a code of an OS included in the memory 211.

Here, the components of the processor 212 may be representations of different functions of the processor 212 that are performed by the processor 212 in response to an instruction provided from a program code stored in the electronic device 110, for example, an instruction provided from the application executed on the electronic device 110. For example, the IoT register 310 may be used as a functional representation of the processor 212 that controls the electronic device 110 to register the IoT device in response to the instruction.

In some scenarios, each IoT device may be controlled by a per-device application that is installed on the electronic device 110, wherein each individual application installed in the electronic device 110 controls one IoT device. However, it may be inconvenient to manipulate an IoT device by installing an individual application for each IoT device.

Accordingly, herein, proposed is a function that, in some example embodiments, may be capable of controlling various types of IoT devices with a single application, for example, a messenger installed on the electronic device 110. In some example embodiments, a set of IoT devices may be controlled without installing a separate application for controlling an IoT device.

Referring to FIG. 4, in operation S410, the processor 212 may read an instruction from the memory 211 to which instructions associated with control of the electronic device 110 are loaded. In this case, the read instruction may include one or more instructions for controlling the processor 212 to perform operations S420 to S440.

In operation S420, the IoT register 310 may add a bot for interaction with an IoT server to a messenger installed on the electronic device 110 and/or may register at least one IoT device controllable by the IoT server through a bot. In some example embodiments, the IoT register 310 may interact with an IoT server by adding an account that is a bot-typed account of the IoT server as a friend on the messenger. That is, in some example embodiments, the IoT register 310 may add a chatroom with the bot to a chatroom list on the messenger in response to an input from a user adding the account of the IoT server. The account may be, for example, a registered and/or official account of the IoT server. In some example embodiments, the account of the IoT server may be opened and/or operated in response to a request from an entity, for example, a provider of an IoT service, a manufacturer of the IoT device, and/or a supplier of the IoT device, associated with the IoT server, which may be one of a plurality of accounts on the messenger that are associated with the IoT server. For example, the IoT register 310 may add the chatroom with the bot after receiving user information, for example, information used to identify the user, such as an ID, registered with the IoT server from the user of the electronic device 110 during a process of adding the user as a friend of the messenger through the account of the IoT server and processing a user authentication. The IoT register 310 may provide a user interface for receiving user information of the user of the electronic device 110 and, accordingly, may add the chatroom with the bot after verifying whether the corresponding user is registered with the IoT server based on user information received from the user. As another example, the IoT register 310 may add the chatroom with the bot through a method of newly registering user information about the user and registered with the messenger to the IoT server in association with the user of the electronic device 110 by sharing the user information with the IoT server, and/or by matching the user information to existing user information about the user and registered with the IoT server. That is, the IoT register 310 may transmit the user information about the user and registered with the messenger to the IoT server to enable the IoT server to newly register the user information input from the user of the electronic device 110. As another example, the IoT register 310 and/or the IoT server may match the user information to the existing user information about the user that has been registered with the IoT server.

When a chatroom with a bot, or a bot provided to enable interaction with the IoT server is added to the messenger installed on the electronic device 110, the IoT register 310 may selectively register an IoT device to be controlled through the bot. When a bot is provided for each manufacturer or supplier of an IoT device and is added to the messenger, the user of the electronic device 110 may register an IoT device desired to be used by the user of the electronic device 110 as a device to be controlled through a chatroom with the bot added to the messenger. For example, the IoT register 310 may receive, from the IoT server, a list of IoT devices that are registered to the IoT server and used by the user, and may register at least one IoT device included in the IoT device list as a target device. As another example, the IoT register 310 may retrieve information about an IoT device that is adjacent to the electronic device 110 through a device search using a near field communication, for example, WiFi, and may register the IoT device as the target device based on the information. The IoT register 310 may store, for example in the messenger, information about an IoT device to be controlled through a bot added to the messenger in association with the messenger. In some example embodiments, instead of storing IoT device information, IoT device identification information and/or a classifier (such as an identifier) that is matched to the IoT device identification information may be stored in association with the user of the electronic device 110. Only and/or at least information required to identify a device in the IoT server may maintain only information required to identify a device, and which may be required for control using the bot. In some example embodiments, the IoT device identification information and/or the classifier may be distinctive for the IoT device, for example, may uniquely identify and/or uniquely describe the IoT device.

When the bot for interaction with the IoT server is added to the messenger installed on the electronic device 110, the IoT register 310 may generate a chatroom in which an account of the user of the electronic device 110 and the account of the IoT server are matched. For example, the IoT register 310 may provide a friend add function in the chatroom with the bot, and/or may add a friend user selected by the user of the electronic device 110 from a friend list on the messenger, that is, another list of users capable of transmitting and/or receiving one or more messages through the messenger, to and/or from the chatroom with the bot. Such messages may be published to the chatroom and/or may be exchanged, directly or indirectly, between the account of the user and the bot. Here, in the chatroom with the bot, the IoT register 310 may designate the user of the electronic device 110 as a host user and may designate the added friend user as a guest user. A right to control the IoT device during a period of time from a point in time at which the friend user is added to the chatroom may be granted to the friend user added to the chatroom with the bot. Some example embodiments may include causing the friend user to be granted the right capable of controlling the IoT device. In some example embodiments, the period of time may be preset. The guest user may be added to the chatroom with the bot that includes the host user, and a chatroom in which an account of the guest user and the account of the IoT server are matched may be newly generated. The guest user and/or the host user may be granted a right to control the IoT device through the chatroom with the bot. When a period of time (such as a desired and/or predetermined period of time) is elapsed, and/or when a separate instruction is received from the host user, the guest user designated by the host user may leave the chatroom with the bot and, optionally, may automatically lose a right to control the IoT device. A period of time during which the IoT device control right is granted to the guest user may be set as default, and/or may be directly set by the host user at a point in time at which the guest user is added.

In operation S430, the IoT controller 320 may control the IoT device through the bot by transmitting, to the IoT server, a control signal for the IoT device specified in response to the control input that is input from the user of the electronic device 110 through the chatroom with the bot. For example, the IoT controller 320 may transmit, to the IoT server, a control signal including a control instruction and/or information about the IoT device specified in response to the control input that is input through the chatroom with the bot, in association with the user of the electronic device 110. That is, the IoT controller 320 may transmit a control signal for the specific IoT device to the IoT server through a communication session established between the account of the user and the account of the IoT server on the messenger. The user of the electronic device 110 may specify an IoT device to be controlled through the chatroom with the bot and/or may specify the control instruction for the IoT device. The chatroom with the bot may include an interface, for example, an IoT device list controllable through the bot and a menu list including a function of each IoT device included in the IoT device list. That is, the control input may be received from the user of the electronic device using the IoT device list and the menu list provided through the chatroom with the bot, and the IoT device to be controlled in response to the received control input and the control instruction may be specified, for example, by selection of the IoT device in the menu list provided in the interface. As another example, the IoT controller 320 may specify the IoT device to be controlled and/or the control instruction by analyzing chat content input from the user to the bot through the chatroom. Such input may be directed by the user to the bot within the chatroom as a public or provide message, and/or may be received by the bot within the chatroom, for example, as a message from the user to another user or account within the chatroom, or as a broadcast by the user to all members of the chatroom including the bot. The IoT controller 320 may verify the IoT device to be controlled and/or the control instruction from a sentence input as a chat message in the chatroom, for example, using syntax analysis using natural language processing or artificial intelligence (AI)-based conversation analysis technology. Here, the IoT controller 320 may transmit, to the IoT server, a control signal that includes the IoT device identification information of the IoT device specified by the user of the electronic device 110 through the chatroom with the bot or an identifier that is matched to the IoT device identification information and a control instruction for a portion of functions of the IoT device. Accordingly, when the IoT server receives the control signal from the electronic device 110 through a messenger server, the IoT server may control an IoT device by identifying the IoT device based on identification information or the identifier included in the control signal and/or by transmitting the control instruction included in the control signal to the identified IoT device.

In operation S440, the IoT manager 330 may record and/or manage control content about the IoT device through the bot in a form of a chat message of the chatroom that includes the bot. The IoT manager 330 may record the control content about the IoT device by storing at least one message transmitted and/or received through the chatroom with the bot. That is, the IoT manager 330 may store, in the memory 221, the control content about the IoT device through the bot as the chat message of the chatroom that includes the corresponding bot, and may manage the control content, for example, delete, correct the stored message, and/or link the stored message with another user. The IoT manager 330 may record and/or display an IoT device specified as a control signal for the IoT device and/or a control instruction as the chatroom message of the chatroom with the bot, through the chatroom with the bot. In response thereto, the user may verify a control history of the IoT device from the chat message displayed on the chatroom with the bot. Here, the control history of the IoT device may be recorded by identifying a chatroom based on chatroom identification information, for example, a chatroom ID. Also, the IoT manager 330 may record/or and manage the control history of the IoT device through the chatroom with the bot by classifying an IoT device based on IoT device identification information or classifier, and/or may use the control history as data for maintaining and repairing the IoT device. The IoT server may also record and/or manage the control history of the IoT device as data, for example, to maintain and/or repair the IoT device.

In some example embodiments, the chatroom with the bot may provide an interface for controlling an IoT device, such as a user interface or an application programming interface (API). For example, the interface may include a counselling interface, for example, an after-sales (AS) service, in association with the IoT device. For example, the IoT manager 330 may provide a chat environment with a counsellor using a communication session established between an account of the user and the account of the IoT server in response to an input of a counselling request for the specified IoT device through the chatroom with the bot. Accordingly, control and/or counselling for the IoT device may be performed in the same and/or similar space using the chatroom with the bot.

According to some example embodiments, various types of IoT devices under an IoT server may be controlled through a bot, for example, by adding the bot for interaction with the IoT server to a messenger without using a separate application for controlling the IoT device.

Figure 5:
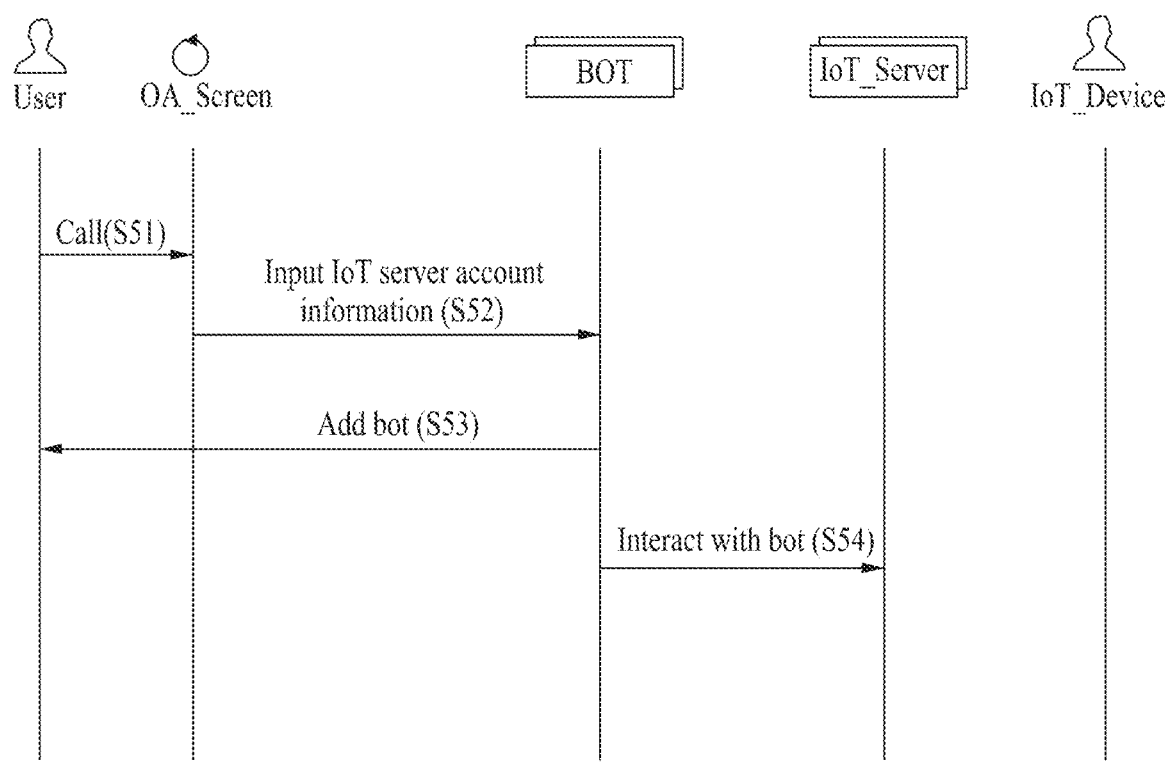
FIG. 5 illustrates an example of a process of adding a bot for interaction with an Internet of Things (IoT) server to a messenger according to at least one example embodiment.

FIG. 5 illustrates an example of a process of adding a bot for interaction with an IoT server to a messenger according to at least one example embodiment.

Referring to FIG. 5, a user may call an account add screen from a messenger installed on the electronic device 110 in operation S51 and may input account information of an IoT server to be added through the account add screen in operation S52.

In operation S53, the electronic device 110 may add, to the messenger, a bot of the IoT server corresponding to account information that is input through the account add screen.

In operation S54, the electronic device 110 may interact with the IoT server (IoT_Server) through the bot added to the messenger.

Here, the electronic device 110 may add the bot for interaction with the IoT server by receiving user information about the user and registered with the IoT server from the user and by processing a user authentication. Alternatively, the electronic device 110 may add the bot for interaction with the IoT server associated with the corresponding user through a method of newly registering user information about the user and registered on the messenger with the IoT server by sharing the user information with the IoT server and/or matching the user information to existing user information about the user and registered with the IoT server.

Figure 6:
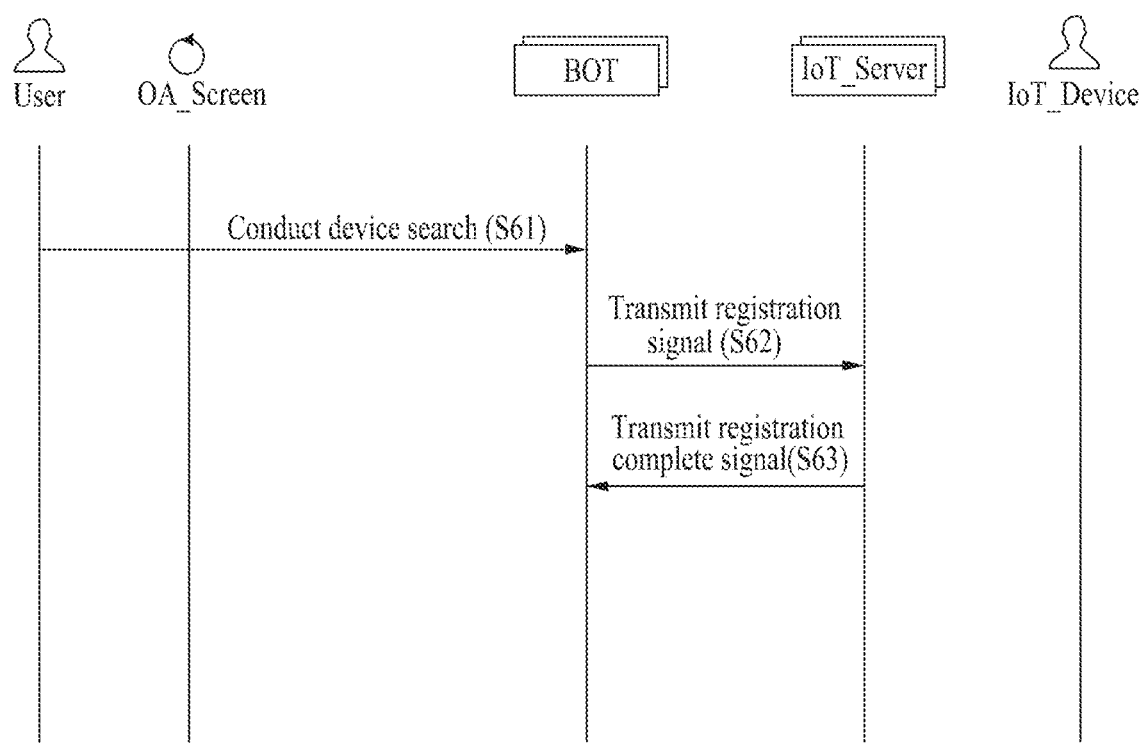
FIG. 6 illustrates an example of a process of registering an IoT device controllable through a bot according to at least one example embodiment.

FIG. 6 illustrates an example of a process of registering an IoT device controllable through a bot according to at least one example embodiment.

When a bot for interaction with an IoT server is added to the messenger, the electronic device 110 may register a device to be controlled through the bot.

Referring to FIG. 6, in operation S61, the electronic device 110 may conduct a nearby device search for the IoT device using wireless communication technology, such as near-field communication (NFC) and/or WiFi.

In operation S62, the electronic device 110 may transmit a registration signal for at least one IoT device retrieved through the device search to the IoT server through the bot added to the messenger. Here, the registration signal may include information for identifying the user of the electronic device 110 and/or IoT device identification information.

In operation S63, the IoT server may register the IoT device with an IoT device list used by the user of the electronic device 110 in response to the registration signal of the electronic device 110, and/or may transmit a registration complete signal to the electronic device 110 when device registration is completed.

Accordingly, the electronic device 110 may register, with the messenger, the IoT device to be controlled through the added bot by performing a device search using wireless technology such as near-field communication (NFC) and/or WiFi.

Figure 7:
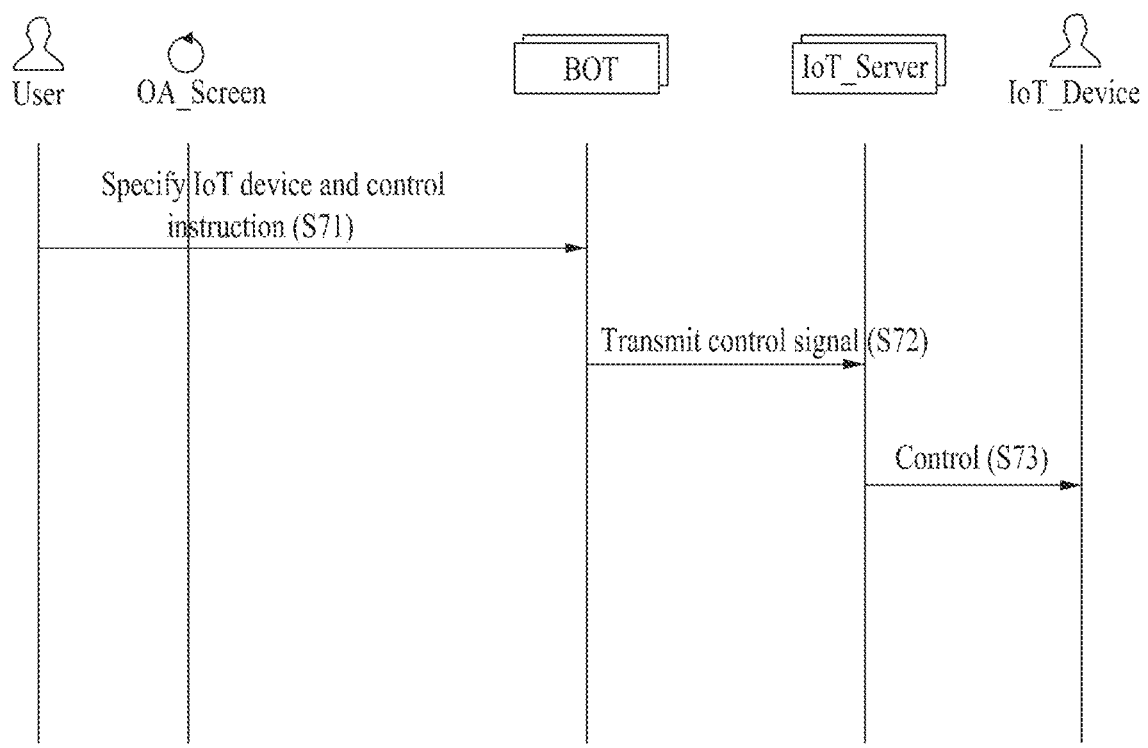
FIG. 7 illustrates an example of a process of controlling an IoT device through a bot according to at least one example embodiment.

FIG. 7 illustrates an example of a process of controlling an IoT device through a bot according to at least one example embodiment.

Referring to FIG. 7, in operation S71, a user may specify an IoT device to be controlled through a chatroom with a bot through a messenger installed on the electronic device 110 and/or may specify a control instruction for the corresponding IoT device.

In operation S72, the electronic device 110 may transmit, to the IoT server, a control signal that includes IoT device identification information specified by the user through the chatroom with the bot, an identifier matched to the IoT device identification information, and/or a control instruction for a portion of functions of the IoT device.

In operation S73, in response to receiving the control signal from the electronic device 110 through the bot, the IoT server may control the IoT device by identifying the IoT device to be controlled based on the identification information or the unique identifier included in the control signal and by transmitting the control instruction included in the control signal to the identified IoT device.

Figure 8:
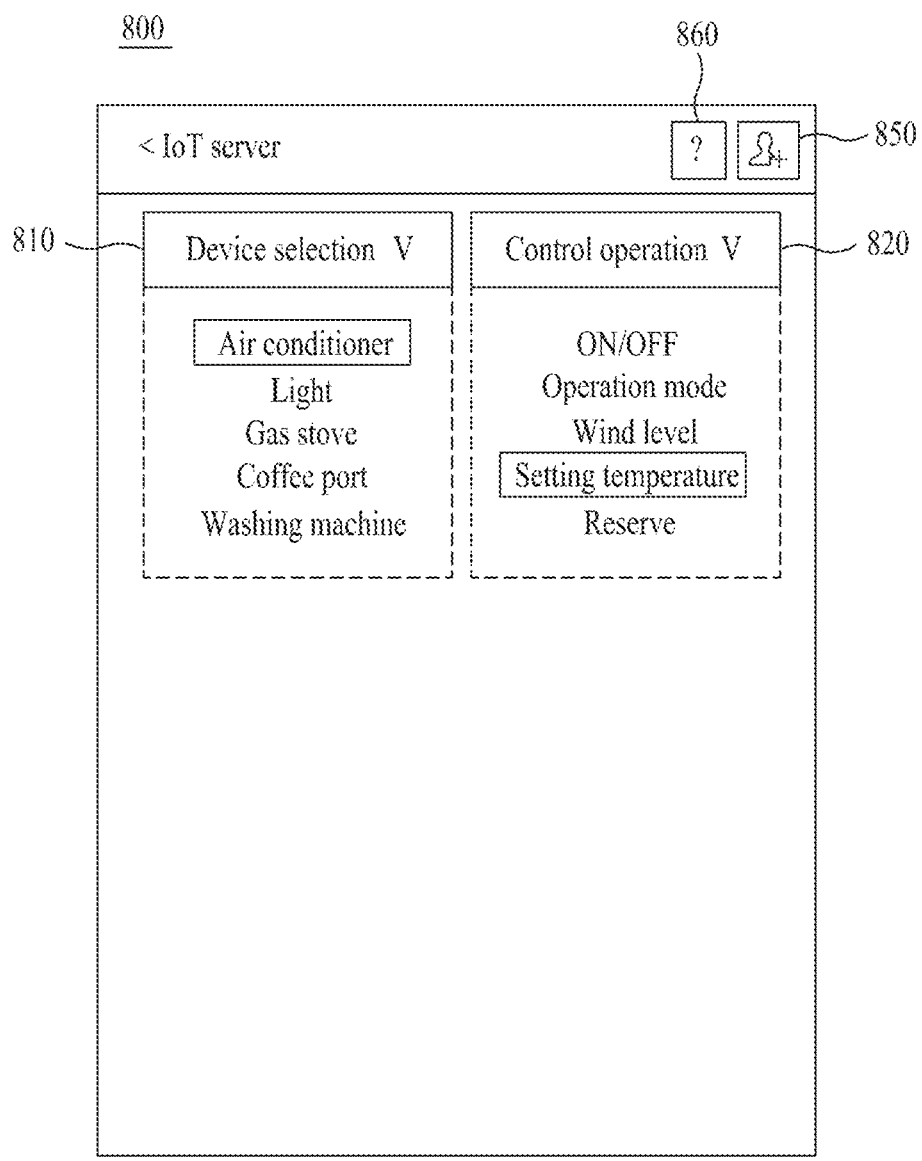
FIGS. 8 to 10 illustrate examples of a chatroom screen with a bot according to at least one example embodiment.

The electronic device 110 may provide an interface, which may enable a user or an application to select and/or specify an IoT device of the IoT device list to be controlled through the chatroom with the bot and the control instruction. Referring to FIG. 8, a chatroom 800 with a bot may include an IoT device list 810 of one or more IoT devices that may be controllable through the bot and a menu list 820 including a function of a corresponding IoT device for each IoT device included in the IoT device list 810. As shown in FIG. 8, the menu list 820 may provide a menu that includes at least one depth, such as at least one hierarchical level of the menu, based on an IoT device, such as the controls or functionality by which the IoT device may be controlled. That is, the user may specify the IoT device to be controlled and the control instruction based on the IoT device list 810 and the menu list 820 provided through the chatroom 800 with the bot.

Figure 9:
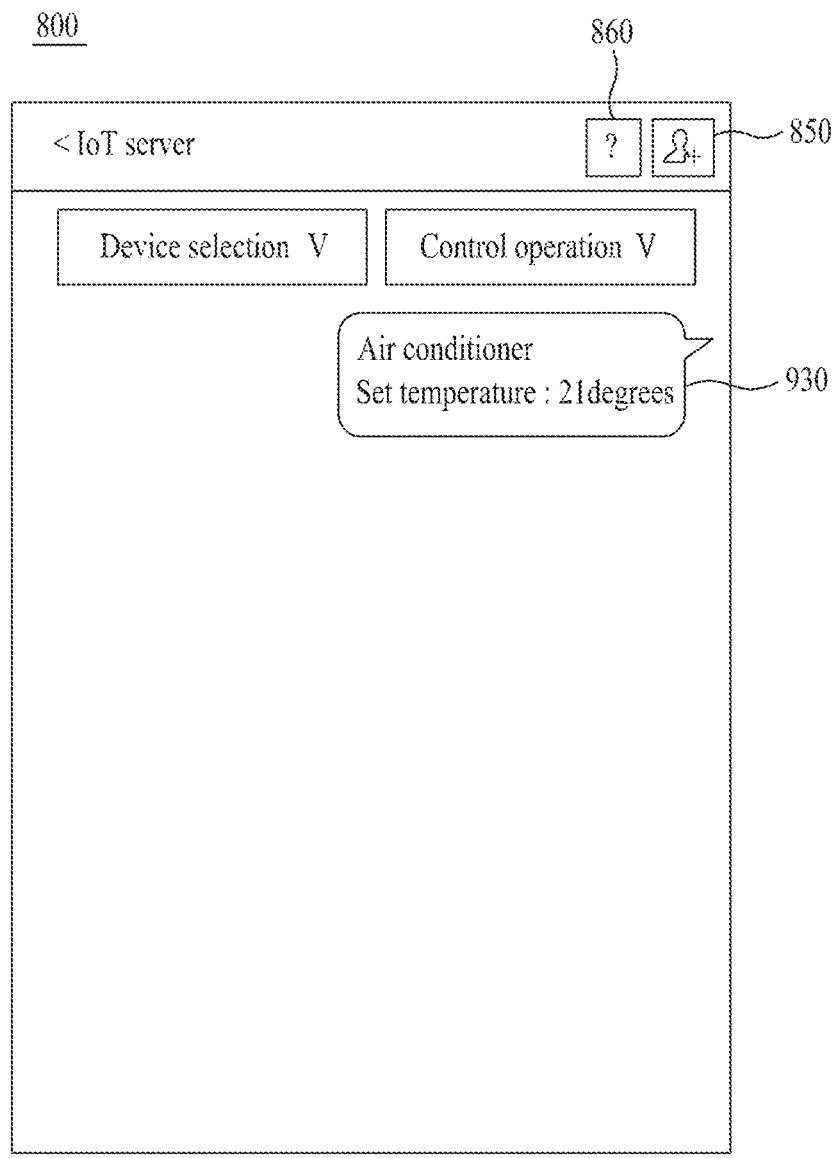

When the IoT device and the control instruction are specified through the chatroom 800 with the bot, the electronic device 110 may transmit, to the IoT server, the control signal that includes information about the IoT device and/or the control instruction through the bot. Here, referring to FIG. 9, the IoT device and the control instruction specified as the control signal for the IoT device may be displayed as a chat message 930 of the chatroom 800. That is, the electronic device 110 may record and/or manage control content about the IoT device through the bot as the chat message 930 of the chatroom 800. Accordingly, the user may verify a control history of the IoT device through the chat message 930 displayed on the chatroom 800 with the bot.

Figure 10:
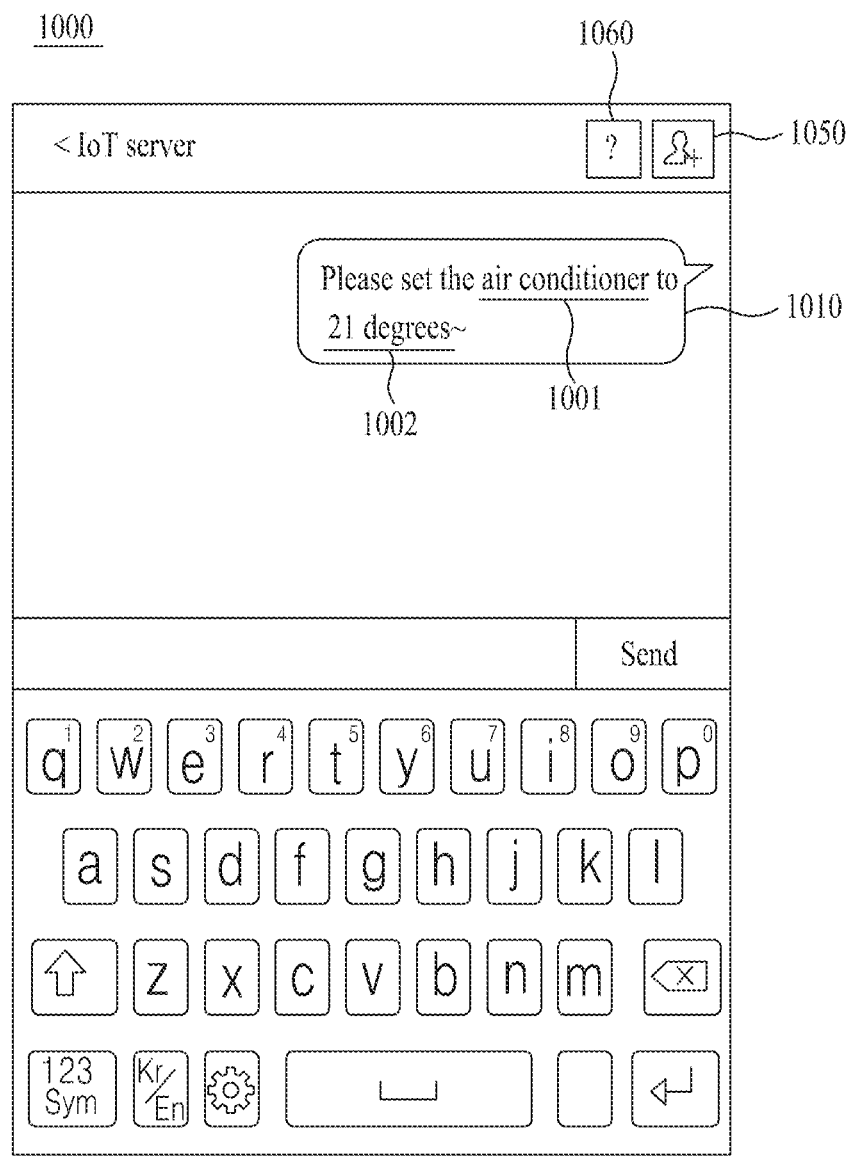

As an alternative or in addition to using the IoT device list 810 and the menu list 820 provided from the chatroom 800 with the bot to specify the IoT device and the control instruction, the electronic device 110 may specify the IoT device to be controlled and/or the control instruction by analyzing a sentence input from the user. Referring to FIG. 10, the user may readily input, to a chatroom 1000 with a bot, an input sentence 1010 representing the intent of controlling an IoT device in a colloquial style. Here, through syntax analysis for the input sentence 1010, the electronic device 110 may verify and/or specify an IoT device 1001 to be controlled and a control instruction 1002 from the input sentence 1010.

In some example embodiments, the chatroom 800, 1000 with the bot may include a friend add menu 850, 1050 for adding a friend selected by the user of the electronic device 110. The user of the electronic device 110 may add, to the chatroom 800, 1000, a friend that is selected from a friend list on the messenger using the friend add menu 850, 1050 in the chatroom 800, 1000 with the bot. Here, the user of the electronic device 110 may be designated as a host user and/or the added friend may be designated as a guest user. The guest user and/or the host user may be granted with a right to control an IoT device through the chatroom 800, 1000 with the bot. When a period of time (for example, a predetermined period of time) is elapsed, and/or when a leave instruction is received from the host user, the guest user may leave the chatroom 800, 1000 with the bot and, optionally, may automatically lose a right to control the IoT device.

In some example embodiments, the chatroom 800, 1000 with the bot may include a counselling menu 860, 1060 for a counseling request for the IoT device. When the user of the electronic device 110 requests counselling for the IoT device using the counselling menu 860, 1060 in the chatroom 800, 1000 with the bot, a chat function with a counsellor may be provided using a communication session established between an account of the user and an account of the IoT server.

Although it is described that the electronic device 110 performs the IoT control method in response to an instruction provided from the application installed on the electronic device 110, it is provided as an example only. However, depending on some example embodiments, a messenger server, for example, the server 150, and/or the IoT server, for example, the server 160, may directly perform at least a portion of the aforementioned IoT control method through interaction with the application installed on the electronic device 110. Also, although it is described that the messenger server and the IoT server are separate independent server systems, such separate independent server systems are provided as an example embodiment only. Depending on some example embodiments, the messenger server may be integrated with the IoT server. Alternatively or additionally, the messenger server may include at least a portion of functions of the IoT server, or vice versa.

In some example embodiments, the processor 222 of the server 150 may include an IoT register, an IoT controller, and/or an IoT manager such that the server 150 may perform the entire or a portion of the IoT control method of FIG. 4. Depending on some example embodiments, the IoT register, the IoT controller, and/or the IoT manager may be selectively included in or excluded from the processor 222. Also, depending on some example embodiments, the components of the processor 222 may be separated and/or merged for functional representation of the processor 222.

The processor 222 and the components of the processor 222 may control the server 150 to perform operations S420 to S440 of FIG. 4. For example, the processor 222 and the components of the processor 222 may be configured to execute an instruction according to a code of at least one program and a code of an OS included in the memory 221.

The IoT register, the IoT controller, and/or the IoT manager included in the processor 222 of the server 150 may be identical or similar to the IoT register 310, the IoT controller 320, and the IoT manager 330 of FIG. 3 or may correspondingly perform operations S420 to S440 of FIG. 4. Accordingly, further description related thereto is omitted here.

According to some example embodiments, various types of IoT devices under an IoT server may be controlled by interaction with the IoT server through a bot added to a messenger, and/or by recording and/or managing control content about an IoT device through an IoT bot in a form of a chat message of a messenger chatroom. Also, according to some example embodiments, a friend may be invited to a chatroom with an IoT bot and/or provided a right to control an IoT device to the invited friend. Further, according to some example embodiments, a control history of an IoT device through a chatroom with an IoT bot may be used as data for maintaining and/or repairing the IoT device, and/or to use the chatroom with the IoT bot as an interface for controlling the IoT device and/or an inquiry and/or counselling interface for the IoT device.

The systems and/or apparatuses described herein may be implemented using processing circuitry, which may include hardware components, software components, and/or a combination thereof. For example, the processing circuitry of a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, the processing circuitry of a processing device may include multiple processors or a processor and a controller. In addition, different processing configurations of the processing circuitry are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to some example embodiments may be recorded in non-transitory computer-readable record media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable record media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described example embodiments, or vice versa.

The foregoing description has been provided for purposes of illustration and description. It is not intended to be exhaustive or to limit the disclosure. Individual elements or features of a particular example embodiment are generally not limited to that particular example embodiment, but, where applicable, are interchangeable and can be used in a selected example embodiment, even if not specifically shown or described. Some example embodiments may also be varied in many ways. Such variations are not to be regarded as a departure from the disclosure, and all such modifications are intended to be included within the scope of the disclosure.

What is claimed is:

1. An Internet of Things (IoT) control method implemented by a computer system including processing circuitry configured to execute computer-readable instructions included in a memory, the method comprising:
adding, by the processing circuitry, a chatroom with a bot for interaction between an IoT server and a user of a messenger installed on the computer system;
providing, on the chatroom, an IoT device selection list including IoT devices controllable through the chatroom with the bot and a menu list including at least one controllable function of an IoT device selected from the IoT devices;
receiving a control input from the user based on a selection from the IoT device selection list and the menu list;
specifying an IoT device among the IoT devices to be controlled and a control instruction for the specified IoT device in response to the control input; and
instructing, by the processing circuitry, the IoT server to transmit a control signal including the control instruction to the specified IoT device in response to the control input.

2. The method of claim 1, wherein the adding includes adding the chatroom with the bot to a chatroom list of the messenger in response to an input from the user adding an account of the IoT server.

3. The method of claim 1, wherein the adding includes,
providing a user interface for receiving user information from the user, and
adding the chatroom with the bot after verifying whether the user is registered with the IoT server based on user information about the user.

4. The method of claim 1, wherein the adding includes transmitting user information about the user and registered with the messenger to the IoT server to enable the IoT server to one of newly register the user information, match the user information to existing user information about the user that has been registered with the IoT server, or both.

5. The method of claim 1, wherein the adding includes,
retrieving information about an IoT device through a device search using near field communication as a device to be controlled through the chatroom with the bot, and
registering the retrieved IoT device based on the information.

6. The method of claim 1, wherein the adding includes storing, as information about the specified IoT device, one of IoT device identification information for the specified IoT device, a classifier matched to the IoT device identification information for the specified IoT device, or both.

7. The method of claim 1, wherein the adding includes adding a friend user selected by the user of the messenger from a friend list of the messenger to the chatroom with the bot.

8. The method of claim 7, wherein the adding includes causing the friend user to be granted a right capable of controlling the specified IoT device during a period of time relative to a point in time at which the friend user is added to the chatroom with the bot.

9. The method of claim 1, further comprising:
recording, by the processing circuitry, control content about the specified IoT device by storing at least one message that is one of transmitted through the chatroom with the bot, received through the chatroom with the bot, or both.

10. A non-transitory computer-readable record medium storing instructions that, when executed by processing circuitry, cause the processing circuitry to perform the method of claim 1.

11. A computer system comprising:
processing circuitry configured to execute computer-readable instructions included in a memory, wherein the processing circuitry is configured to
add a chatroom with a bot for interaction between an IoT server and a user of a messenger installed on a computer system,
provide, on the chatroom, an IoT device selection list including IoT devices controllable through the chatroom with the bot and a menu list including at least one controllable function of an IoT device selected from the IoT devices,
receive a control input from the user based on a selection from the IoT selection device list and the menu list,
specify an IoT device among the IoT devices to be controlled and a control instruction for the specified IoT device in response to the control input, and
instruct the IoT server to transmit a control signal including the control instruction to the specified IoT device in response to the control input.

12. The computer system of claim 11, wherein the processing circuitry is configured to add the chatroom with the bot to a chatroom list of the messenger in response to an input from the user adding an account of the IoT server.

13. The computer system of claim 11, wherein the processing circuitry is configured to,
provide a user interface to the user,
receive user information from the user through the user interface, and
add the chatroom with the bot after verifying whether the user is registered to the IoT server based on the user information.

14. The computer system of claim 11, wherein the processing circuitry is configured to store, as information about the specified IoT device, one of IoT device identification information for the specified IoT device, a classifier matched to the IoT device identification information for the specified IoT device, or both.

15. The computer system of claim 11, wherein the processing circuitry is configured to,
add a friend user selected by the user of the messenger from a friend list of the messenger to the chatroom with the bot, and
cause the friend user to be granted a right capable of controlling the IoT device during a period of time relative to a point in time at which the friend user is added to the chatroom with the bot.

16. The computer system of claim 11, wherein the processing circuitry is further configured to record control content about the specified IoT device by storing at least one message that is one of transmitted through the chatroom with the bot, received through the chatroom with the bot, or both.

17. The method of claim 1, wherein providing the IoT device selection list and the menu list includes providing a different menu list including at least one function of another IoT device in response to receiving an input indicating a selection of the other IoT device.

18. The computer system of claim 11, wherein the processing circuitry is configured to provide a different menu list including at least one function of another IoT device in response to receiving an input indicating a selection of the other IoT device.

19. An Internet of Things (IoT) control method implemented by a computer system including processing circuitry configured to execute computer-readable instructions included in a memory, the method comprising:
adding, by the processing circuitry, a chatroom with a bot for interaction between an IoT server and a user of a messenger installed on the computer system wherein the bot is related to an IoT server to control a plurality of IoT devices and wherein the plurality of IoT devices are controllable through the chatroom with the bot;
providing, on the chatroom, an IoT device selection list including the plurality IoT devices and a menu list including at least one controllable function of a respective IoT device;
receiving a control input from the user based on a selection from the IoT device selection list and the menu list, wherein receiving the control input includes receiving a chat content input from the user to the bot through the chatroom;
analyzing the chat content input received through the chatroom;
specifying an IoT device among the plurality of IoT devices to be controlled and a control instruction for the IoT device in response to the control input and the analysis of the chat content input; and transmitting to the IoT server, by the processing circuitry, a control signal including identification information of the specified IoT device and the specified control instruction to the specified IoT device in response such that the IoT server controls the specified IoT device according to the specified control instruction.

\* \* \* \* \*